United States Patent [19]
Goto et al.

[11] Patent Number: 5,278,607
[45] Date of Patent: Jan. 11, 1994

[54] PHOTOMETERING DEVICE IN SINGLE LENS REFLEX CAMERA

[75] Inventors: Kazuo Goto, Tokyo; Tadao Watanabe, Yamagata, both of Japan

[73] Assignee: Asahi Kogaku Kogyo Kabushiki Kaisha, Tokyo, Japan

[21] Appl. No.: 765,328

[22] Filed: Sep. 25, 1991

[30] Foreign Application Priority Data

Oct. 5, 1990 [JP] Japan ............................ 2-105104[U]
Nov. 7, 1990 [JP] Japan ............................ 2-117123[U]
Nov. 7, 1990 [JP] Japan ............................ 2-117124[U]

[51] Int. Cl.$^5$ ........................................ G03B 7/099
[52] U.S. Cl. .................................. 354/476; 354/478
[58] Field of Search .................. 354/476, 478, 482

[56] References Cited

U.S. PATENT DOCUMENTS

| | | | |
|---|---|---|---|
| 3,451,323 | 6/1969 | Uno et al. | 354/476 |
| 3,903,413 | 9/1975 | Manning | 354/482 |
| 4,019,191 | 4/1977 | Miyata | 354/476 |
| 4,341,448 | 7/1982 | Toyoda et al. | 354/476 |
| 4,429,964 | 2/1984 | Schaefer | 354/476 |
| 4,445,765 | 5/1984 | Yamamoto | 354/478 |
| 4,475,803 | 10/1984 | Katsuma et al. | 354/481 |
| 4,615,602 | 10/1986 | Eguchi | 354/478 |
| 4,774,539 | 9/1988 | Suda et al. | 354/482 X |

FOREIGN PATENT DOCUMENTS 1947501 3/1971 Fed. Rep. of Germany .
1092268 11/1967 United Kingdom .

OTHER PUBLICATIONS

United Kingdom Search Report. Jan. 8, 1992 R. A. Short.
French Search Report and Annex. J. W. Boeykens, Dec. 29, 1992.
English Translation of German Office Action. Dr. Bischof, Jan. 26, 1993.
French Search Report and Annex No. 9112237. May, 21, 1992, Boeykens, J. W.
French Search Report and Annex No. 9200454. May, 21, 1992, Boeykens, J. W.
Two United Kingdom Search Reports No. 9121016.1. Jan. 8, 1992, R. A. Short.

*Primary Examiner*—Michael L. Gellner
*Assistant Examiner*—Jae N. Noh
*Attorney, Agent, or Firm*—Sandler Greenblum & Bernstein

[57] ABSTRACT

A photometering device in a single lens reflex camera having a photometering device mounting portion on a magnifier of a finder optical system, and a photometering element which is mounted to the photometering device mounting portion, including a substrate to which the photometering element is secured, a pair of horizontally elongated holes for the vertical adjustment and at least one adjusting hole for the horizontal adjustment, formed in the substrate, adjusting pins which are rotatably supported on the photometering device mounting portion and which have eccentric disc portions which can be fitted in the associated elongated holes of the substrate, and a reference hole corresponding to said adjusting hole and formed in the photometering device mounting portion.

19 Claims, 5 Drawing Sheets

PHOTOMETERING DEVICE IN SINGLE LENS REFLEX CAMERA

BACKGROUND OF THE INVENTION

1. Field of the Invention

The present invention relates to a device having a photometering element (light receiving element), and more precisely, relates to a photometering device in a single lens reflex camera.

2. Description of Related Art

In a known photometering device in a single lens reflex camera in which light measurement is effected on a focusing plate of a finder optical system, the photometering element is usually located on the upper portion of a magnifier. The photometering element must be adjusted during assembly in the vertical and horizontal directions thereof to meet a predetermined metering position. There are many types of position adjustment mechanisms for adjusting a photometering element, for example, the mechanism which uses two holes and two screws, wherein the two screws are loosely fitted in the corresponding holes and fastened after the adjustment is completed, or the use of an eccentric pin in combination with an adhesive, or an adhesive only, etc.

However, in the first mentioned type, there is a possibility that the photometering element may be accidentally displaced before the photometering element is fixed, even after the adjustment is completed. In the second type mechanism using an eccentric pin, it is difficult to precisely adjust the photometering element in both the vertical and horizontal directions since the eccentric pin tends to rotate.

Furthermore, it is also known to provide a protection frame having a waterproof filler (waterproof plastic) which covers the photometering element. The protection frame decreases the freedom of adjustment particularly in the vertical direction. The larger the protection frame, the lesser the freedom. To increase the freedom of adjustment, the height of the camera must be increased.

Furthermore, air tends to enter the waterproof filler upon injection into the protection frame producing air bubbles in the solidified waterproof filler. The air bubbles tend to decrease the sensitivity of the photometering element. The mixture of air into the waterproof filler is basically caused by an inconsistent flow of the waterproof filler when it is injected into the protection frame.

SUMMARY OF THE INVENTION

The primary object of the present invention is to provide a position adjusting mechanism of a photometering element in which the adjustment can be easily and precisely carried out.

Another object of the present invention is to provide a photometering device for a single lens reflex camera in which a photometering element is covered by a protection frame, wherein the freedom of adjustment of the photometering element is increased, particularly in the vertical direction without increasing the height of the camera.

Still another object of the present invention is to provide a photometering device in which a photometering element is covered by a protection frame and a waterproof filler is injected into the protection frame, wherein air is prevented from mixing with the waterproof filler upon injection into the protection frame, thereby preventing deterioration of the photometering element's sensitivity, due to the air bubbles.

To achieve the objects mentioned above, in a single lens reflex camera having a photometering device mounting portion on the magnifier of the finder optical system, and a photometering element which is mounted to the photometering device mounting portion, according to the present invention, a photometering device comprises a substrate to which the photometering element is secured. A pair of horizontally elongated holes and at least one adjusting hole for horizontal adjustment are formed in the substrate. Eccentric adjusting pins are rotatably supported on the photometering device mounting portion and have eccentric disc portions which can be fitted in the associated elongated holes of the substrate, and a reference hole corresponding to said adjusting hole is formed in the photometering device mounting portion.

With this arrangement, the adjustment in the vertical direction can be effected by the rotation of the eccentric adjusting pins and the adjustment in the horizontal direction can be effected by the reference hole and the adjusting hole, independently of the adjustment in the vertical direction.

According to another aspect of the present invention, there is provided a photometering device provided on a magnifier of a finder optical system in a single lens reflex camera. The photometering device includes a photometering optical axis inclined at a predetermined inclination angle with respect to the optical axis of the finder optical system, and includes a photometering device mounting portion which is provided on the magnifier and which has a horizontal supporting plate portion substantially parallel to the finder optical axis. A photometering element is provided on the horizontal supporting plate portion and is covered by a protection frame, and the protection frame is provided with an inclined lower surface which is substantially parallel to the finder optical axis.

With this arrangement, since the horizontal supporting plate portion of the photometering device mounting portion is substantially parallel to the lower surface of the protection frame, the freedom of adjustment of the protection frame and accordingly the photometering element in the vertical direction can be increased.

Preferably, the inner surface of the protection frame is provided with a recess in which a filter is provided. The protection frame can be provided with at least one injection hole through which the waterproof filler is injected in the protection frame. Furthermore, the protection frame is preferably provided with at least one air discharging hole through which air escapes upon injection. Consequently, air in the protection frame can be discharged therefrom, so that no air bubbles will be produced during the injection of the waterproof filler into the protection frame.

The present disclosure relates to subject matter contained in Japanese Utility Model applications No. 2-105104 (filed on Oct. 5, 1990), No. 2-117123 (filed on Nov. 7, 1990) and No. 2-117124 (filed on Nov. 7, 1990) which are expressly incorporated herein by reference in their entireties.

BRIEF DESCRIPTION OF THE DRAWINGS

The invention will be described below in detail with reference to the accompanying drawings, in which.

DESCRIPTION OF THE PREFERRED EMBODIMENTS

The illustrated embodiment is applied to a chip-on-board (COB) type photometering device in which a photometering element is integrally provided on a printed circuit board.

Figure 1:
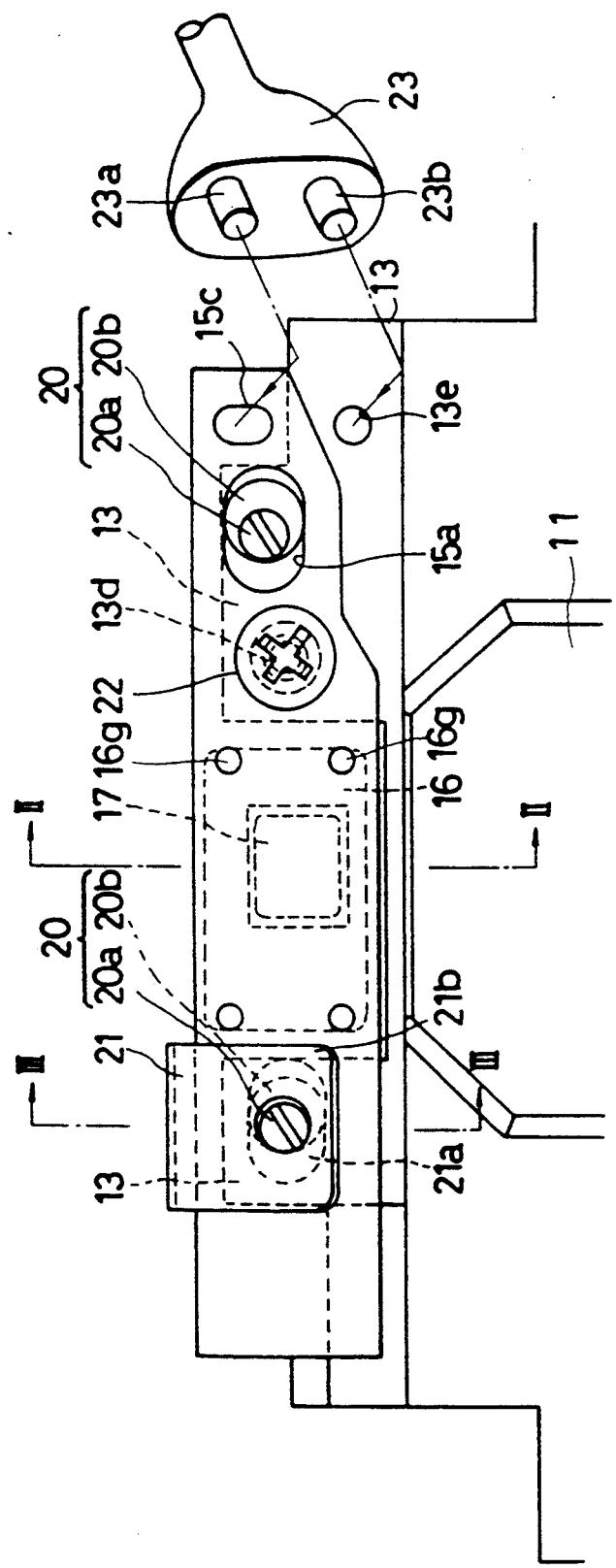
FIG. 1 is a rear view of a position adjusting device in a single lens reflex camera, according to the present invention.

A finder magnifier 12 is located behind a pentagonal prism 11 of a single lens reflex camera. The finder magnifier 12 has a support frame 12a and a lens assembly 12b which is held by the support frame 12a. A known prism sheet supporting the pentagonal prism 11 has a photometering device mounting portion 13 which extends on the finder magnifier 12. The photometering device mounting portion 13 has an oblique supporting portion 13a of a photometering lens 14, oblique ends 13b having abutments against which a photometering element substrate 15 bears, and a horizontal supporting plate portion 13c which is located below a protection frame 16. The photometering device mounting portion 13 also serves as a light intercepting wall to intercept light, which is transmitted through the finder magnifier 12, which would otherwise enter the photometering device. The optical axis O' of the photometering device forms an angle θ with respect to the optical axis O of the finder to detect the predetermined position on a focusing plate. The oblique ends 13b of the photometering device mounting portion 13 are perpendicular to the photometering optical axis O' and project upward on opposite sides of a photometering element (light receiving element) 17, as can be seen in FIG. 1.

The photometering element 17 provided on the photometering element substrate 15 is covered by a waterproof filler 18 which is enclosed in a protection frame 16. The protection frame 16 is made of molded plastic and retains the waterproof plastic filler 18 upon injection of the waterproof filler.

The protection frame 16 is generally U-shaped in cross section. In particular, the protection frame 16 has a recess so that the waterproof filler 18 and the light receiving element 17 may be contained therein. The protection frame 16 has a light receiving window 16a on the front surface thereof. The light receiving window 16a is connected to a recess 16b which is formed in the protection frame 16 and which has a depth substantially identical to the thickness "t" of a luminosity correcting filter 19 on the outer periphery of the light receiving window 16a provided in the recess 16b. The protection frame 16 has connecting holes 16c, 16d and 16e which connect the outer surface to the inner surface thereof at the corners of the protection frame 16. The connecting hole 16c is an injection hole through which the waterproof filler 18 is injected in the protection frame 16. The upper and lower connecting holes 16d and 16e are air discharging holes through which an air is discharged upon injection. The injecting hole 16c and the air discharging (relief) holes 16d, 16e are located on opposite sides of the light receiving element 17. The connecting hole 16c has a diameter larger than the diameter of the relief holes 16d and 16e. The inner corners of the protection frame 16 are rounded, as shown at 16f so as to ensure a smooth flow of the waterproof filler at the corners. The protection frame 16 has mounting legs 16g projecting toward the substrate 15 at the four corners thereof.

The protection frame 16 is provided with a lower oblique surface 16h which is substantially parallel with the finder optical axis O and the horizontal supporting plate portion 13c when the substrate 15 and the protection frame 16 are mounted to the mounting portion 13. The oblique surface 16b is inclined at an inclination angle θ with respect to the photometering optical axis O' of the photometering lens 14. The inclination angle θ is identical to an angle θ formed by the finder optical axis O and the photometering optical axis O'. The protection frame 16 has an upper surface 16i which is parallel with the photometering optical axis O', i.e., perpendicular to the photometering element substrate 15.

Figure 2:
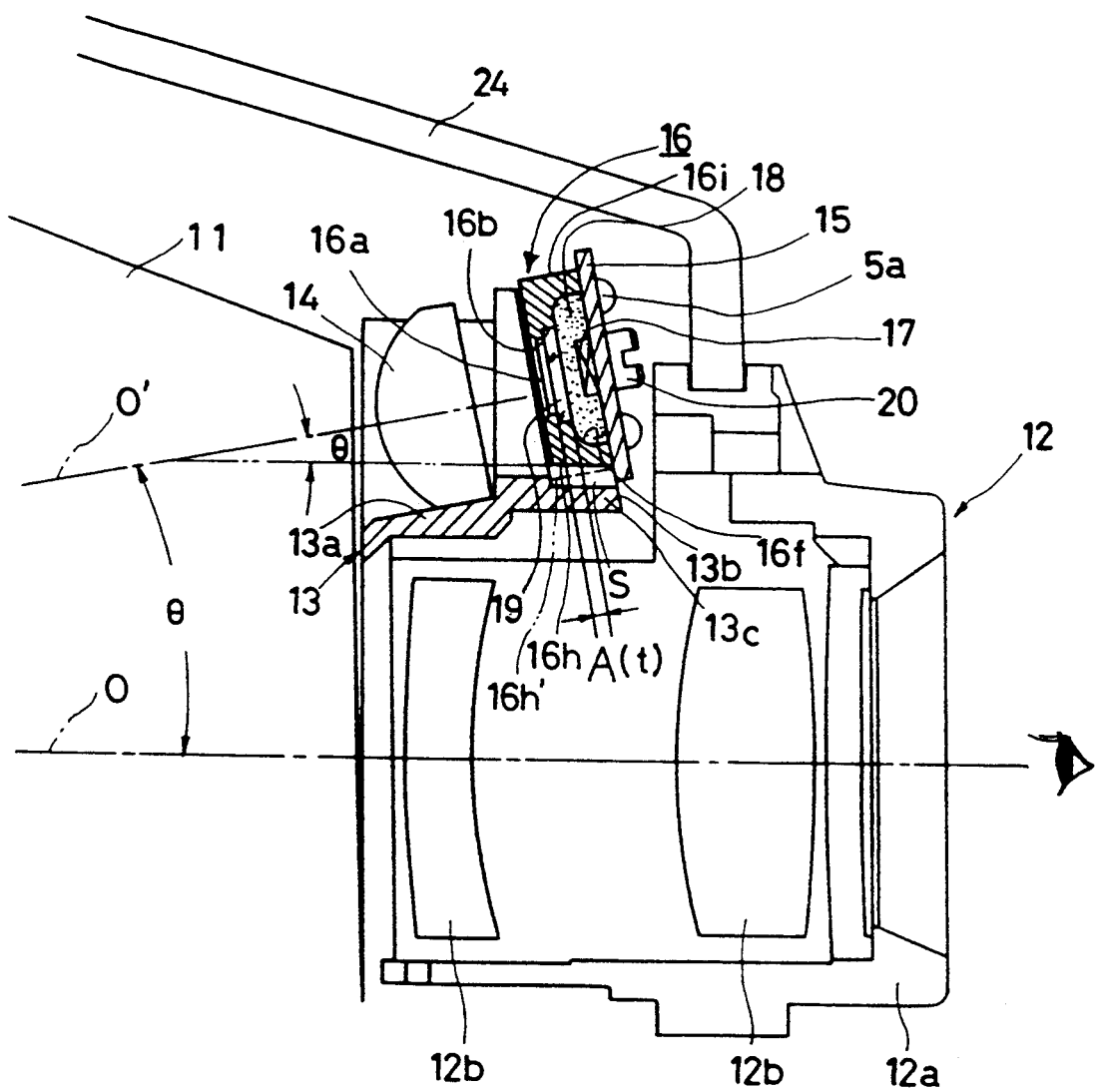
FIGS. 2 and 3 are sectional views taken along the lines II—II and III—III in FIG. 1, respectively.
Figure 3:
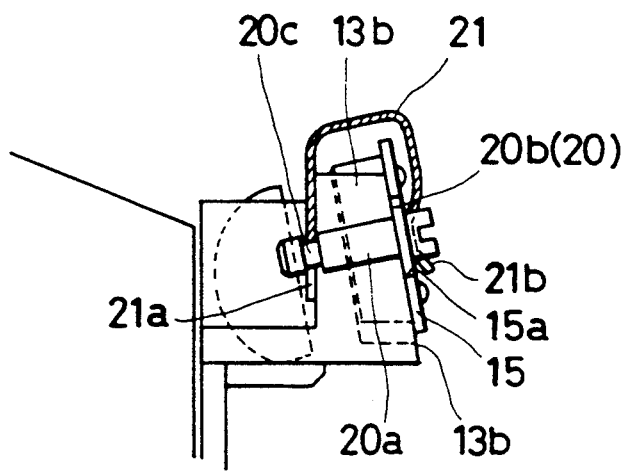
Figure 4:
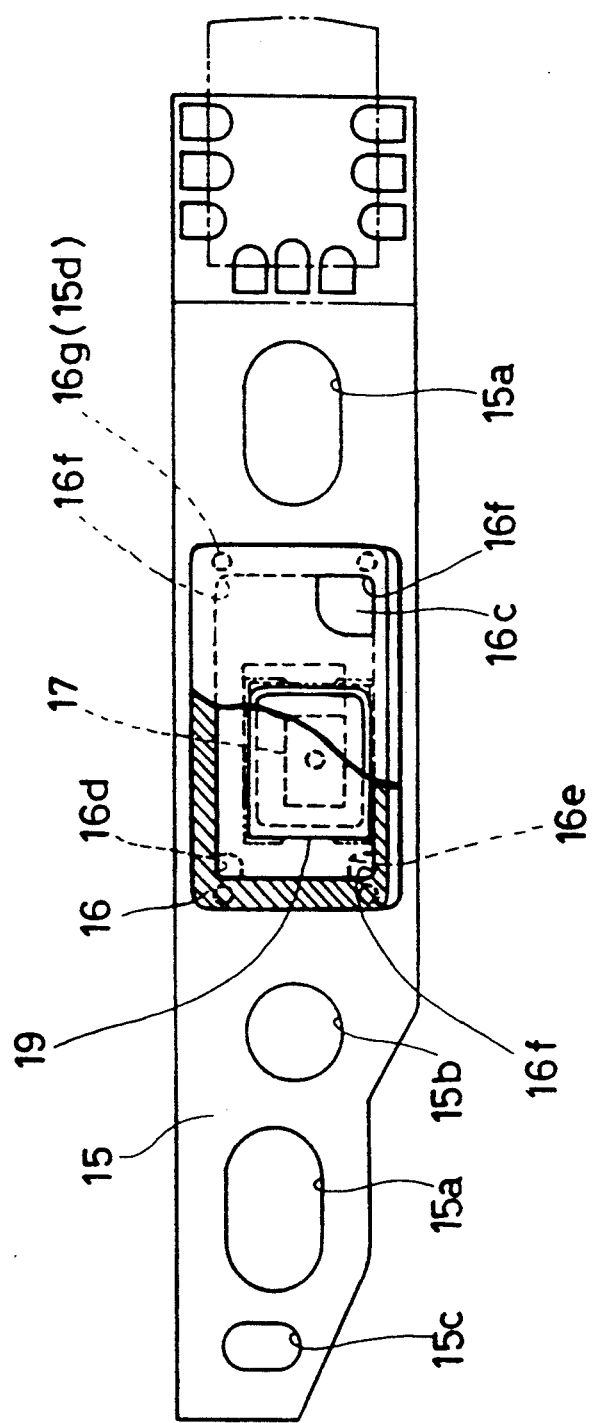
FIG. 4 is a partially broken front elevational view of a substrate of a photometering element in assembly; and, FIG. 5 is an exploded perspective view of a substrate of a photometering element before assembly.
Figure 5:
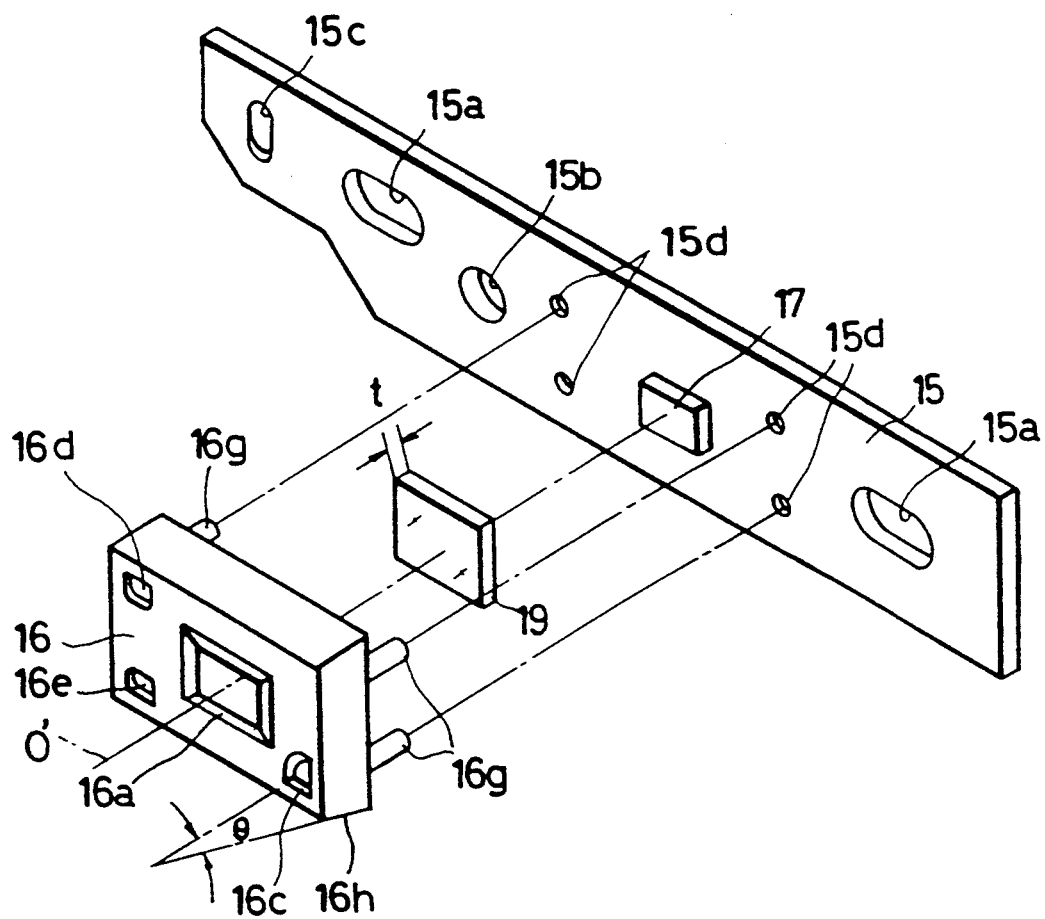

In the prior art, the oblique surface 16h was parallel with the optical axis O' of the photometering lens 14, i.e., perpendicular to the substrate 15, as shown by an imaginary line 16h' in FIG. 2.

The substrate 15 has a pair of right and left elongated holes 15a extending in the lateral (horizontal) direction, a set screw inserting hole 15b, a vertically elongated hole 15c for the adjustment in the vertical direction, and fixing holes 15d in which the legs 16g of the protection frame 16 are fitted.

The photometering element 17, the protection frame 16, the waterproof filler 18 and the correcting filter 19 are sub-assembled on the substrate 15, as follows.

The photometering element 17 is first mounted on the substrate 15, and then, the correcting filter 19 is fitted in the recess 16b of the protection frame 16 from the inner side thereof and is provisionally secured thereto, for example, by a small amount of adhesive or a small amount of waterproof filler 18. Thereafter, the mounting legs 16g of the protection frame 16 are fitted in the fixing holes 15d of the substrate 15 and are secured to the substrate 15 by thermal calking of the projecting ends of the mounting legs. In this state, the correcting filter 19 precisely faces the light receiving surface of the photometering element 17, and the inner surface of the correcting filter 19 is substantially flush with the inner surface of the protection frame 16 (i.e., the bottom surface of the recess of the protection frame). Finally, the waterproof filler 18 is injected into the recess of the protection frame 16 through the injecting hole 16c thereof by an injecting nozzle (not shown) or the like. The injection is finished when the waterproof filler reaches the opening portions of the connecting holes 16d and 16e of the protection frame 16.

Since the inner corners 16f of the protection frame 16 are rounded as mentioned above, the recess of the protection frame 16 is completely filled with the waterproof filler to the rounded corners 16f preventing air, and accordingly air bubbles, from entering the waterproof filler, even if a waterproof filler having a high viscosity is used.

Furthermore, the inner surface of the protection frame 16, (that is, the bottom surface of the recess of the protection frame 16) is substantially flush with the inner surface of the correcting filter 19 adjacent to the substrate 15, as mentioned above. This also prevents air from entering the waterproof filler 18, thus eliminating the problem of production of air bubbles.

Upon injecting the waterproof filler 18 into the protection frame 16, the waterproof filler 18 begins spreading inside the injecting hole 16c or the vicinity thereof, so that the air in the protection frame 16 is discharged therefrom through the discharging holes 16d and 16e spaced from the injecting hole 16c. This ensures a smooth injection.

When the protection frame 16 is fully filled with the waterproof filler 18 through the injecting hole 16c, the waterproof filler 18 comes to the openings of the discharging holes 16d and 16e indicating that the protection frame 16 is completely filled with the waterproof filler 18 for example when the waterproof filler 18 comes up to the opening of the discharging hole 16d which is located farthest from the connecting hole 16c. Accordingly, the amount of the waterproof filler 18 to be injected into the protection frame 16 can be precisely set and controlled.

The above discussion for the surroundings of the photometering element 17 can be applied to a general photometering device (light receiving device) other than the photometering device of a single lens reflex camera.

The right and left oblique ends 13b of the photometering device mounting portion 13 rotatably support shaft portions 20a of eccentric adjusting pins 20 which have eccentric disc portions 20b eccentric to the shaft portions 20a. The eccentric disc portions 20b are snugly fitted in the corresponding elongated holes 15a of the substrate 15 of the subassembly between the upper and lower sides of the elongated holes 15a.

The substrate 15 is pressed against the oblique ends 13b of the photometering device mounting portion 13 by a substrate keeping spring 21 which is generally U-shaped, so that the substrate 15 and the oblique ends 13b are located between the two legs of "U". One of the legs is provided with a bifurcated portion 21a in which the small diameter portion 20c of one of the eccentric adjusting pins 20 is engaged. A pressing portion 21b of the other leg of "U" comes into elastic contact with the substrate 15. The substrate keeping spring 21 provides a biasing force allowing the substrate 15 to move in frictional contact with the oblique end 13b and ensures a positive engagement between the eccentric disc portions 20b of the eccentric adjusting pins 20 and the elongated holes 15a of the substrate 15.

One of either the right or left oblique ends 13b of the photometering device mounting portion 13 has a threaded hole 13d corresponding to the set screw inserting hole 15b of the substrate 15, so that a set screw 22 can be inserted in the set screw inserting hole 15b and screwed in the threaded hole 13d, and a reference hole 13e located below the adjusting elongated hole 15c of the substrate 15.

The pentagonal mirror 11, the photometering device mounting portion 13, and the front portion of the finder magnifier 12 are covered by an upper decoration plate 24.

The substrate 15 held on the photometering device mounting portion 13 of the subassembly is adjusted and set as follows.

When the shaft portions 20a of the right and left eccentric adjusting pins 20 are rotated while the set screw 22 is loosened, the substrate 15 is moved up and down due to the eccentricity of the disc portions 20b fitted in the elongated holes 15a with respect to the shaft portions 20a. As a result, the position of the photometering element substrate 15, and accordingly the photometering element 17 can be adjusted in the vertical direction.

To adjust the position of the photometering element 17 in the horizontal direction, a pair of shafts 23a and 23b of an adjusting tool (jig) 23 are fitted in the adjusting elongated hole 15c of the substrate 15 and the reference hole 13e of the photometering device mounting portion 13. Thereafter, the adjusting tool 23 is rotated about the shaft 23b (reference hole 13e), so that the substrate 15 is moved in the lateral direction (horizontal direction). Since the lateral displacement of the substrate is effected by the elongated holes 15a and the eccentric disc position 20b, independently of the vertical adjustment thereof, the lateral adjustment which does not include a displacement component in the vertical direction can be precisely carried out.

Upon completion of the adjustment in the vertical and horizontal directions, the set screw 22 is fastened to secure the substrate 15 to the photometering device mounting portion 13. The adjusting and securing operations are thus completed.

In addition to the foregoing, since the oblique surface 16h of the protection frame 16 is parallel with the horizontal support plate portion 13c of the photometering device mounting portion 13, the freedom of adjustment of the protection frame 16 (photometering element 17 and the substrate 17) in the vertical direction is increased. The protection frame 16 is adjusted in the vertical direction in a space S in FIG. 2. In other words, the height of the camera can be decreased, since the protection frame 16 can be designed so that the position of the protection frame 16 is lowered to the lower limit of the space S.

We claim:

1. In a single lens reflex camera having a photometering device mounting portion on a magnifier of a finder optical system, and a photometering element which is mounted to the photometering device mounting portion, wherein a photometering device comprises:
   a substrate to which the photometering element is secured,
   a pair of horizontally elongated holes for the vertical adjustment and at least one adjusting hole for the horizontal adjustment, said holes being formed in the substrate,
   adjusting pins which are rotatably supported on the photometering device portion and which have eccentric disc portions which can be fitted in the associated elongated holes of the substrate; and
   a reference hole corresponding to said at least one adjusting hole and being formed in the photometering device mounting portion.

2. A photometering device according to claim 1, further comprising a protection frame which is secured to the substrate to cover the photometering element.

3. A photometering device according to claim 2, wherein the photometering device includes an optical axis which is inclined at a predetermined angle with respect to an optical axis of the finder optical system.

4. A photometering device according to claim 3, wherein said photometering device mounting portion comprises a horizontal supporting plate portion which is substantially parallel to the optical axis of the finder optical system.

5. A photometering device according to claim 4, wherein said protection frame is provided on its bottom surface with an oblique surface which is substantially parallel to the optical axis of the finder optical system.

6. A photometering device according to claim 5, wherein the adjusting hole is an elongated hole.

7. A photometering device according to claim 5, further comprising a luminosity correcting filter held by the protection frame.

8. A photometering device according to claim 7, further comprising a waterproof filler held by the protection frame between the luminosity correcting filter and the photometering element.

9. A photometering device according to claim 8, wherein the surface of the luminosity correcting filter that is located adjacent to the photometering element is substantially flush with the inner surface of the protection frame.

10. A photometering device according to claim 9, wherein the protection frame is provided with an injection hole through which the waterproof filler is injected into the protection frame.

11. A photometering device according to claim 10, wherein the protection frame is provided with at least one air discharging hole through which an air in the protection frame is discharged therefrom upon injection of the waterproof filler into the protection frame.

12. A photometering device according to claim 11, wherein the injection hole has a diameter larger than the diameter of the air discharging hole.

13. A photometering device according to claim 12, wherein the protection frame has rounded inner corner portions.

14. A photometering device according to claim 13, wherein the adjusting hole and the reference hole correspond to a pair of shafts of an adjusting tool which is to be used to adjust the position of the substrate in the horizontal direction, so that the shafts of the adjusting tool can be rotatably fitted in the adjusting hole and the reference hole.

15. A light receiving device comprising:
a substrate;
a light receiving element provided on the substrate;
a protection frame secured to the substrate to cover the light receiving element;
a light receiving window formed in the protection frame and facing the light receiving element;
a recess formed in the protection frame and located inside the light receiving window;
a filter provided in the recess and having a thickness substantially identical to the depth of the recess, said filter having an inner surface which is substantially flush with the inner surface of the protection frame; and,
a waterproof filler embedded in the protection frame between the filter and the light receiving element.

16. A light receiving device according to claim 15, wherein said protection frame is provided with an injection hole through which the waterproof filler is injected in the protection frame.

17. A light receiving device according to claim 16 wherein said protection frame is provide with at least one air discharging hole through which air in the protection frame is discharged therefrom upon injection of the waterproof filler into the protection frame.

18. A light receiving device according to claim 17, wherein the injection hole has a diameter larger than the diameter of the air discharging hole.

19. A light receiving device according to claim 18, wherein the protection frame has rounded inner corner portions.

* * * * *

UNITED STATES PATENT AND TRADEMARK OFFICE
CERTIFICATE OF CORRECTION

PATENT NO. : 5,278,607

DATED : January 11, 1994

INVENTOR(S) : Kazuo GOTO et al.

It is certified that error appears in the above-indentified patent and that said Letters Patent is hereby corrected as shown below:

On the title page, item: [57], "ABSTRACT", line 8, change "secured. a" to ---secured. A---.

On the title page, item : [57], "ABSTRACT", line 10, change "," to ---are---.

On the title page, item:[57], "ABSTRACT", line 13, after "portions" delete "which".

On the title page, item: [57], "ABSTRACT", line 15 change "said" to ---the---.

At column 8, line 23 (claim 17, line 1) insert ---,--- after "16".

Signed and Sealed this

Twelfth Day of September, 1995

*Attest:*

BRUCE LEHMAN

*Attesting Officer*  *Commissioner of Patents and Trademarks*